United States Patent Office 3,431,313
Patented Mar. 4, 1969

3,431,313
2-HALO-1,1,3,3-TETRAFLUOROPROPANES
Bernard M. Regan, Chicago, Ill., assignor to Baxter Laboratories, Inc., Morton Grove, Ill., a corporation of Delaware
No Drawing. Original application Feb. 2, 1966, Ser. No. 538,523, now Patent No. 3,362,874. Divided and this application Sept. 12, 1967, Ser. No. 667,065
U.S. Cl. 260—653     3 Claims
Int. Cl. C07c *19/08, 17/16;* A61k *13/00*

ABSTRACT OF THE DISCLOSURE

The compounds 2-chloro-1,1,3,3-tetrafluoropropane and 2-bromo-1,1,3,3-tetrafluoropropane, useful as inhalation anesthetics, and the method of preparing said compounds by reaction of 1,1,3,3-tetrafluoro-2-propyl p-toluenesulfonate and alkali halide at a temperature of about 200° C. to about 220° C.

---

This is a division of application Ser. No. 538,523, filed Feb. 2, 1966, now U.S. Patent 3,362,874.

This invention relates to novel halotetrafluoropropanes. More particularly, this invention relates to certain monohalotetrafluoropropanes having a chlorine or bromine atom substituted on the number two carbon atom, namely, 2-chloro-1,1,3,3-tetrafluoropropane and 2-bromo-1,1,3,3-tetrafluoropropane.

It is known that certain halogenated alkanes are useful inhalation anesthetics. Chloroform and halothane are well-known examples of such compounds which are halogen derivatives of the lower alkanes, methane and ethane, respectively. More recently, it has also been found that certain halogenated propanes are useful inhalation anesthetics. Thus, Dishart, U.S. Patent 3,034,959, discloses the inhalation anesthetic use of 3-bromo-1,1,2,2-tetrafluoropropane which is a position isomer of one of the compounds of the present invention, namely, the 2-bromo-1,1,3,3-tetrafluoropropane. However, the usefulness of 3-bromo-1,1,2,2-tetrafluoropropane is limited since it has been found to cause too high an incidence of cardiac arrhythmias in man to be recommended for use. Stephen and North, 25 Anesthesiology, 600–6 (1964). The 3-chloro-1,1,2,2-tetrafluoropropane isomer also is disclosed by Dishart as having anesthetic properties. However, it is described by Dishart as being unsuitable for use as an anesthetic for human beings or commercially valuable animals since it frequently results in cardiac arrhythmias as disclosed by Fabian et al., 39 Anesthesia and Analgesia, 456–62 (1960).

Other position isomers of the monohalotetrafluoropropanes of this invention also are known. Thus, 1-chloro-1,1,2,2-tetrafluoropropane is disclosed by Henne et al., 59 J. Am. Chem. Soc'y., 2434–6 (1937); 2-chloro-1,1,1,2-tetrafluoropropane is disclosed by McBee et al., 69 J. Am. Chem. Soc'y., 944–7 (1947); and 3-bromo-1,1,1,3-tetrafluoropropane is disclosed by Tarrant et al., 77 J. Am. Chem. Soc'y., 2783–7 (1955). However, the latter three compounds are not known as clincially useful inhalation anesthetics. Certain other related halogenated tetrafluoropropanes, e.g., 1,2,2,3-tetrachloro-1,1,3,3-tetrafluoropropane, are known to be nonanesthetic and convulsant.

It has now been found that the novel monohalotetrafluoropropanes having a chlorine or bromine atom substituted on the number two carbon atom, as defined herein, are useful nonflammable inhalation anesthetics in mice, having a very high inhalation margin of safety when compared with inhalation anesthetics in current use, namely, ether, chloroform, and halothane. Moreover, the novel compounds of this invention are substantially and significantly less hepatotoxic than these conventional inhalation anesthetics. As such, they hold very good promise as effective and useful agents for inducing anesthesia in man.

The novel monohalotetrafluoropropanes defined herein can be employed as inhalation anesthetic agents by utilizing apparatus or machines designed for the vaporization of liquid anesthetics and the admixture thereof with oxygen, air or other gaseous mixtures containing oxygen in amounts capable of supporting respiration.

The novel anesthetics should be free from toxic impurities which may be present according to the particular method of preparation. They may be admixed with other pharmaceutically acceptable materials such as stabilizers, e.g., thymol, or one or more known inhalation anesthetics, e.g., nitrous oxide, ether, chloroform, halothane, cyclopropane and methoxyflurane.

The 2-bromo-1,1,3,3-tetrafluoropropane boils at 83° C. and the 2-chloro-1,1,3,3-tetrafluoropropane boils at 65° C. They can be conveniently stored in containers normally used for conventional inhalent anesthetics of comparable boiling points, e.g., ether, chloroform and halothane.

The novel monohalotetrafluoropropanes of the present invention can be conveniently prepared from a suitable alkali metal halide and the p-toluenesulfonate ester of 1,1,3,3-tetrafluoropropan-2-ol by reaction at about 200°–220° C. in a suitable diluent followed by separation of the desired products from the reaction mixture.

Potassium bromide is the preferred alkali metal halide used for the preparation of 2-bromo-1,1,3,3-tetrafluoropropane and potassium chloride is the preferred alkali metal halide used for the preparation of 2-chloro-1,1,3,3-tetrafluoropropane. Other alkali metal halides, for example, the corresponding lithium halides, can be substituted for the above potassium halides provided that they are sufficiently soluble in the diluent to provide suitable reaction. Generally, from about one to about two moles of the alkali metal halide are used per mole of the p-toluenesulfonate esters in the above reaction.

Examples of suitable diluents for use in the above reaction are: glycols, such as diethylene glycol and triethylene glycol; sulfones, such as dimethyl sulfone and diethyl sulfone; and certain amides which are high boiling polar solvents, for example, N-methyl pyrrolidone.

Although a reaction temperature of about 200°–220° C. is described above, it will be understood that there can be some variation in this temperature, depending upon the boiling point of the diluent and other conditions of the reaction.

Upon completion of the above reaction, the desired products can be separated from the reaction mixture by fractional distillation with or without prior washings with water or with a mixture of about 60% sulfuric acid-40% water.

The intermediate p-toluenesulfonate ester of 1,1,3,3-tetrafluoropropan-2-ol which is used to prepare the novel inhalation anesthetics defined herein also is a novel compound. It can be conveniently prepared by reacting a mixture of equimolar equivalents of 1,1,3,3-tetrafluoropropan-2-ol, p-toluenesulfonyl chloride and sodium hydroxide or similar alkali in water, preferably at about 20°–40° C., and then separating the 1,1,3,3-tetrafluoro-2-propyl p-toluenesulfonate from the reaction mixture.

Although the above methods of preparation and reaction conditions are specifically described it will be understood that the novel compounds of this invention are not limited to these specific reaction conditions or to these specific methods of preparation.

The following examples will further illustrate the present invention, although the invention is not limited to these specific examples.

EXAMPLE I 1,1,3,3-tetrafluoropropan-2-ol (I): Hydrogen at the rate of one-half liter per minute was bubbled through 1,3-dichloro-1,1,3,3-tetrafluoroacetone at −4° C. The mixture of vapors passed through a Pyrex tube (45 cm. x 1.9 cm. I.D.) containing 2% palladium on carbon granules (4–12 mesh) and heated to 200° C. The reaction products were condensed in a trap cooled by Dry Ice. A 750:1 ratio by weight of dichlorotetrafluoroacetone to palladium is optimum.

In a typical run 1250 gm. (6.28 moles) of dichlorotetrafluoroacetone was vaporized with hydrogen during 22 hours and the mixture passed over 85 gm. of palladium-carbon catalyst. Fractional distillation of the reaction products gave 704 gm. (5.33 moles, 85% of theory) of crude I, B.P. 106–109° C., suitable for use in the next step.

Alternatively, the alcohol I can be prepared by reduction of 1,1,3,3-tetrafluoroacetone with sodium borohydride. The I obtained in this manner had B.P. 107–109° C., $n_D^{19}$ 1.333. The identity of the alcohols prepared in these two ways was confirmed by infrared spectra.

EXAMPLE II 1,1,3,3-tetrafluoro-2-propyl p-toluenesulfonate (II): A mixture of crude 1,1,3,3-tetrafluoro-2-propanol (I) (315 gm., 2.4 moles), p-toluenesulfonyl chloride (460 gm., 2.4 moles) and 600 ml. of water was stirred as 5 N sodium hydroxide (514 ml., 2.57 moles) was added during 1.5 hours, and the temperature was maintained between 25°–40° C. Stirring was continued for 16 hours. The lower layer of crude II was separated, stirred, evacuated to between 25–40 mm. Hg and heated to 125° C. until volatile impurities ceased to be removed. Five hundred eighty-three gm. (2.04 moles, 85% of theory) of crude ester II suitable for use in subsequent steps was obtained. Crystallization from ligroin gave II, M.P. 31° C., $n_D^{25}$ 1.466.

*Analysis.*—Calculated for $C_{10}H_{10}F_4O_3S$: C, 41.91; H, 3.52; S, 11.20%. Found: C, 42.13; H, 3.63; S, 10.95%.

EXAMPLE III 2-bromo-1,1,3,3-tetrafluoropropane (III): To a stirred mixture of potassium bromide (357 gm., 3.0 moles) in 700 ml. of diethylene glycol heated to between 200–210° C., crude 1,1,3,3-tetrafluoro-2-propyl p-toluenesulfonate (II) (572 gm., 2.0 moles) was added during 1.5 hours. The vapors of III rose through a Vigreaux distilling column and descended through a cold-water spiral condenser. The liquid product was collected in an ice-cooled receiver for 1.5 hours after the addition of II was completed. It was chiefly a mixture of III, 1,4-dioxane and water, from which the III was purified by successive washings with water and aqueous 60% sulfuric acid. It was neutralized by a wash with cold dilute aqueous sodium hydroxide. The crude bromide III amounted to 314 gm. (81.5% of theory). Fractional distillation gave 256 gm. III, $B_{.744}$ 82.6–82.8° C. Pure (99.9% by G.L.C.) III has $B_{.760}$ 83° C., $d_4^{20}$ 1.8743, $n_D^{20}$ 1.3691 and a vapor pressure of 57 mm. Hg at 20° C. Its vapor pressure-temperature equation is $$\log P = 8.1590 - \frac{1878.4}{T}$$

Its 60 mc. nuclear magnetic resonance (NMR) and infrared spectra confirmed the $CHF_2$—$CHBr$—$CHF_2$ structure.

EXAMPLE IV 2-chloro-1,1,3,3-tetrafluoropropane (IV): In the same manner as for the bromide III, potassium chloride (81 gm., 1.07 moles), 350 ml. of diethylene glycol and crude tosyl ester II (202.7 gm., 0.71 mole) were caused to react and the crude chloride IV (93 gm., 86% theory) was isolated after successive water washings. Fractional distillation gave 65 gm. of IV, $B_{.744}$ 64.4–64.7° C. Pure (99.9% by G.L.C) IV has $B_{.760}$ 65° C., $d_4^{20}$ 1.4914, $n_D^{20}$ 1.3345 and a vapor pressure of 122 mm. Hg at 20° C. Its vapor pressure-temperature equation is $$\log P = 8.0475 - \frac{1747.3}{T}$$

Its 60 mc. NMR and infrared spectra confirm the
$CHF_2$—$CHCl$—$CHF_2$
structure.

EXAMPLE V

Inhalation of the vapor of 2-bromo-1,1,3,3-tetrafluoropropane or 2-chloro-1,1,3,3-tetrafluoropropane admixed with air according to the procedure described by Robbins, 86 J. Pharmacol. Exper. Therap. 197–204 (1946), produced anesthesia in white mice. The minimum concentration by volume percent needed to produce full anesthesia in 50% of the mice in five minutes, $AC_{50}$, and the minimum concentration by volume percent needed to kill 50% of the mice in five minutes, $LC_{50}$, are given in Table I, below. The inhalation margin of safety as measured in mice by the $LC_{50}/AC_{50}$ ratio is also given for the above compounds. For purposes of comparison, similar data which was obtained under the same conditions as for the above compounds is given for three inhalation anesthetics in current use, viz., ether, chloroform and halothane, and for the 3-bromo- and 3-chlorotetrafluoropropanes which are position isomers of the compounds of this invention. The number of mice used with the different agents varied from 25 to 92 for determining each of the $AC_{50}$ and $LC_{50}$ doses.

TABLE I.—INHALATION ANESTHESIA IN MICE

| Compound | $AC_{50}$ | $LC_{50}$ | $LC_{50}/AC_{50}$ |
|---|---|---|---|
| $CHF_2$-$CHBr$-$CHF_2$ | 0.50 | 9.67 | 19 |
| $CHF_2$-$CHCl$-$CHF_2$ | 0.64 | 8.10 | 12 |
| Ether | 3.83 | 13.6 | 3.6 |
| Chloroform | 0.95 | 2.63 | 2.8 |
| Halothane | 0.78 | 2.74 | 3.5 |
| $CHF_2$-$CF_2$-$CH_2Br$ | 0.65 | 2.44 | 3.7 |
| $CHF_2$-$CF_2$-$CH_2Cl$ | 1.05 | 3.79 | 3.6 |

The results set forth in the above table show a substantial and significant improvement in the inhalation margin of safety of the compounds of this invention compared to the three inhalation anesthetics in current use and to the isomeric 3-bromo- and 3-chlorotetrafluoropropanes.

EXAMPLE VI

The hepatotoxicity of the novel inhalation anesthetics of the present invention was determined essentially according to the method of Jones et al., 19 Anesthesiology, 715–23 (195). The anesthetics were dissolved in corn oil and administered to white mice by gavage. The MHT 3+ is the minimal dose causing severe microscopic manifestations of hepatotoxicity (fatty change) 24 hours after administration. The $AD_{50}$ is the dose causing anesthesia in 50% of the test mice in 10 minutes; the $LD_{50}$ is the dose causing death in 50% of the test mice in 24 hours. The hepatotoxic margin of safety by the oral route in mice is given by the ratio, MHT 3+/$AD_{50}$ and is recorded in Table II, below. For purposes of comparison, similar data which were obtained under the same conditions as for the above compounds are given for four inhalation anesthetics in current use, viz., ether, chloroform, halothane and methoxyflurane.

TABLE II.—ORAL HEPATOTOXICITY IN MICE

| Compound | MHT 3+ mM./kg. | $AD_{50}$, mM./kg. | $LD_{50}$, mM./kg. | MHT 3+/$AD_{50}$ |
|---|---|---|---|---|
| $CHF_2$-$CHBr$-$CHF_2$ | 17 | 3.3 | 15 | 5.0 |
| $CHF_2$-$CHCl$-$CHF_2$ | 25 | 4.9 | 39 | 5.0 |
| Ether | 58 | 30 | 37 | 1.9 |
| Chloroform | 3.1 | 24 | [1] 23 | 0.13 |
| Halothane | 2.4 | 23 | 62 | 0.10 |
| Methoxyflurane | 2.5 | 7.1 | 23 | 0.35 |

[1] After 48 hours the $LD_{50}$ was only 4.8. Chloroform was the only anesthetic tested which showed significant mortality later than 24 hours after administration.

The results set forth in the above table show a substantial and significant improvement in the hepatotoxic margin of safety by the administration of the novel compounds of this invention by the oral route as compared to the four inhalation anesthetics in current use.

Variations and modifications may be made in the present invention without departing from the spirit or scope thereof, and it is to be understood that all such variations and modifications are included within the scope of the invention as defined in the appended claims.

What is claimed is:

1. An organic monohalotetrafluoropropane having the formula:

$$CHF_2-CHX-CHF_2$$

in which X is selected from the group consisting of chlorine and bromine.

2. The monohalotetrafluoropropane of claim 1 in which X is chlorine.

3. The monohalotetrafluoropropane of claim 1 in which X is bromine.

References Cited

UNITED STATES PATENTS

| | | | |
|---|---|---|---|
| 3,080,430 | 3/1963 | Cohen | 200—653 |
| 3,362,874 | 1/1968 | Regan | 167—52.6 |

DANIEL D. HORWITZ, *Primary Examiner.*

U.S. Cl. X.R.

424—350